United States Patent [19]

Zimmer

[11] 4,446,540

[45] May 1, 1984

[54] ACOUSTIC WELL LOGGING WITH ENERGY LEVEL DETECTION

[75] Inventor: Mark D. Zimmer, Katy, Tex.

[73] Assignee: Halliburton Company, Duncan, Okla.

[21] Appl. No.: 230,189

[22] Filed: Feb. 2, 1981

[51] Int. Cl.³ .............................................. G01V 1/40
[52] U.S. Cl. .......................................... 367/26; 367/98
[58] Field of Search ....................... 367/26, 28, 29, 30, 367/98; 181/105, 103

[56] References Cited

U.S. PATENT DOCUMENTS

| | | | |
|---|---|---|---|
| 3,289,157 | 11/1966 | Brokaw | 367/26 |
| 3,622,963 | 11/1971 | Sage | 367/98 X |
| 4,040,001 | 8/1977 | Vivet et al. | 367/26 |
| 4,106,016 | 8/1978 | Cerra et al. | 343/7.4 |
| 4,168,483 | 9/1979 | Parthasarathy et al. | 367/28 |
| 4,210,965 | 7/1980 | Ingram | 367/26 |
| 4,349,896 | 9/1982 | Hall, Jr. | 367/26 |

Primary Examiner—Maynard R. Wilbur
Assistant Examiner—K. R. Kaiser
Attorney, Agent, or Firm—W. J. Beard

[57] ABSTRACT

A well logging method and apparatus for detecting the first arrival of an acoustic wave in a logging signal under adverse signal conditions. The received acoustic signal is amplified at a fixed gain until clipped at the largest amplitude throughout the logging procedure. This amplified signal is converted RMS to DC level signal and stored in sample and hold means for a period shortly before first arrival of the acoustic wave. The continuing DC level signal and the stored DC level signal are compared to produce a comparator output DC signal when the continuing DC signal has a certain increased magnitude. This certain increased magnitude is used to generate a pulse of given magnitude and duration that is especially suitable in digital data systems.

10 Claims, 5 Drawing Figures

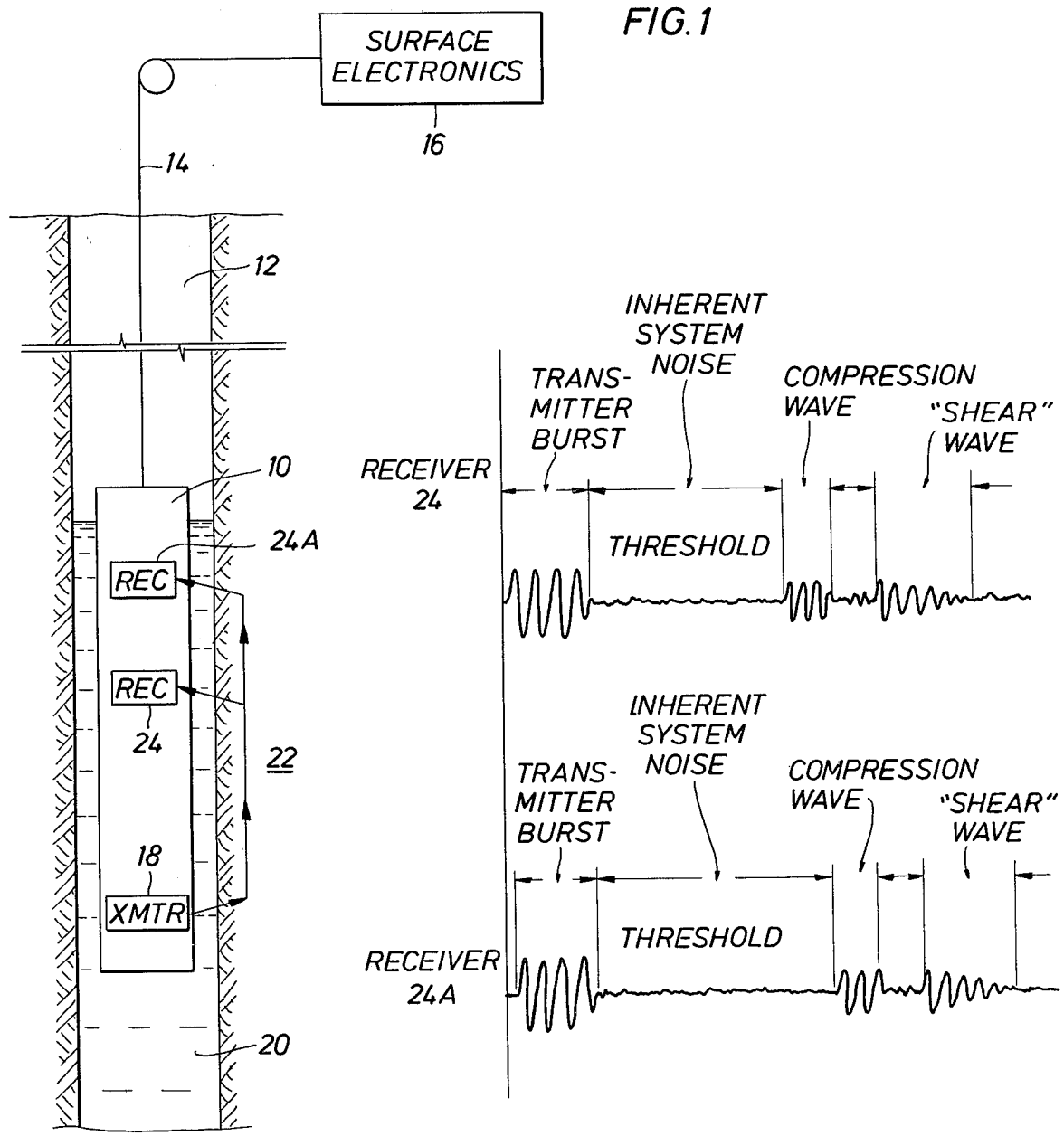

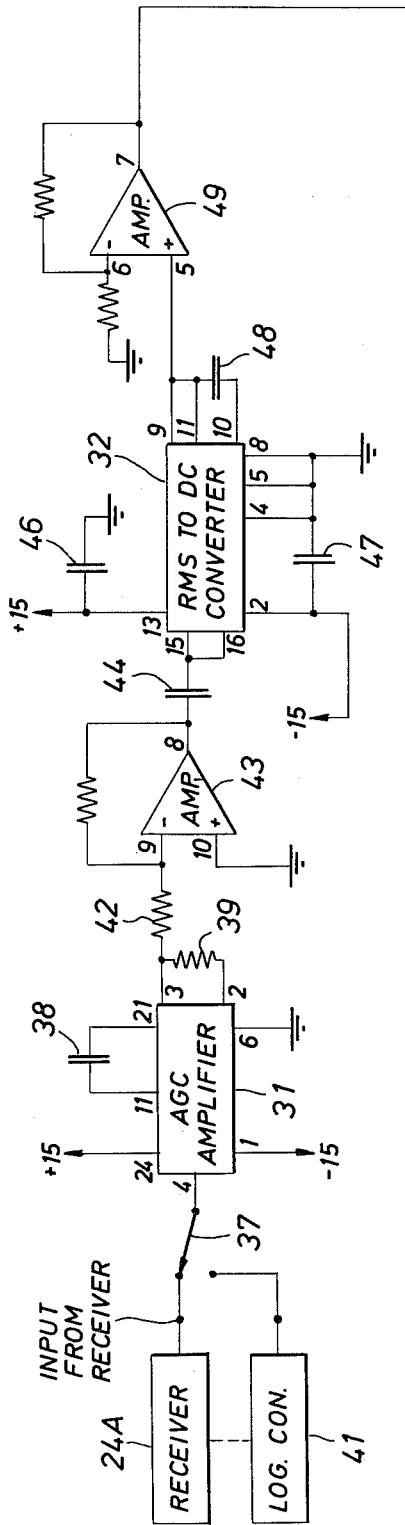
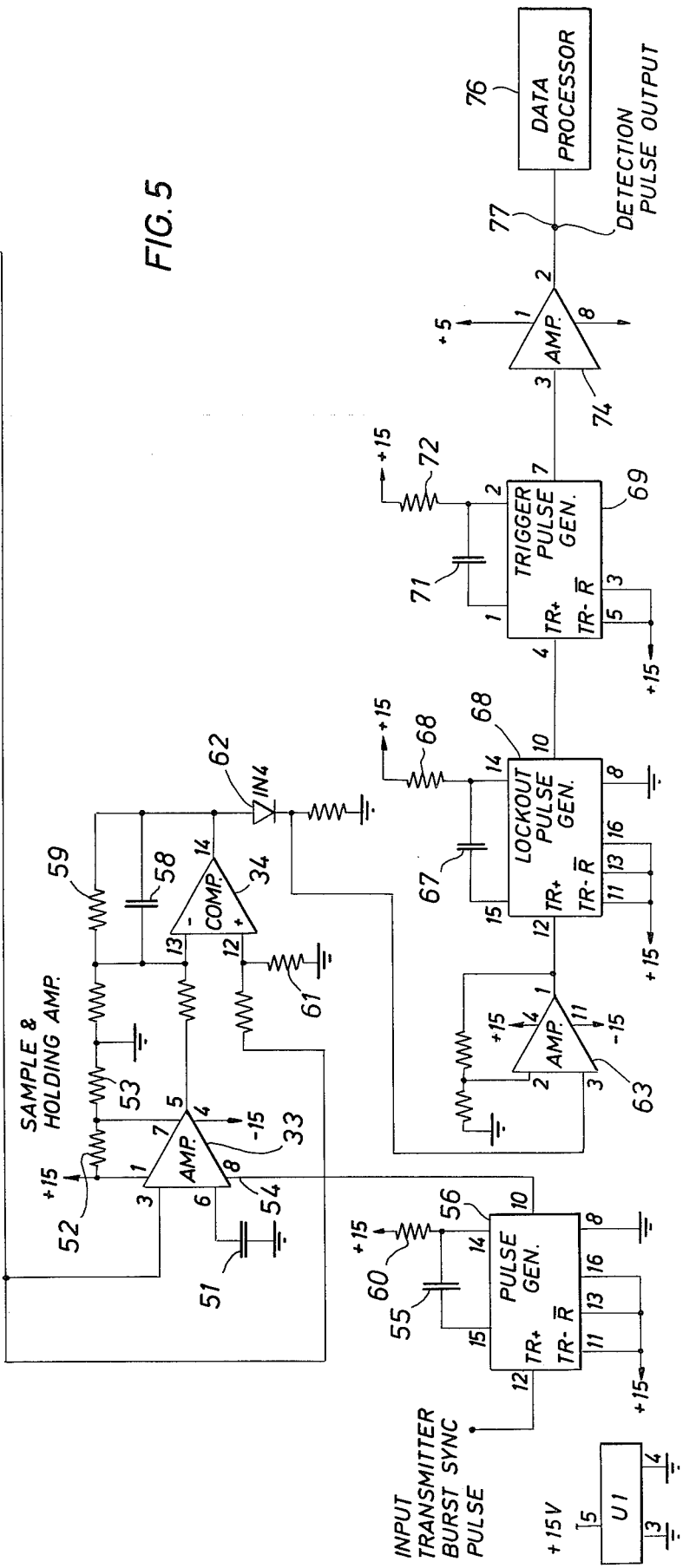
FIG. 5

ACOUSTIC WELL LOGGING WITH ENERGY LEVEL DETECTION

BACKGROUND OF THE INVENTION

1. Field of the Invention

The invention pertains to acoustical well logging and more particularly to treating well-logging signals so as to more accurately determine the timed first arrival of the acoustic signal after the transmitter burst by measuring energy content of the signal relative to threshold noise.

2. Description of the Prior Art

Conventionally, the received analog logging signal is detected at the surface from the cable connected to the downhole logging tool and amplified in a manually controlled amplifier. The output of the amplifier is applied to time measuring circuits where the zero-crossing location of the signal after the arrival of the signal greater than a preset threshold level, is used as the time reference point for the onset of the compression wave. As mentioned, it is conventional that the gain of the amplifier be log-operator dependent. Further, it is common to make one logging run while setting the amplifier and then make another run at the amplifier setting for developing the actual logging signal to be utilized in analysis.

The detection of the first arrival of the acoustic wave or signal in downhole receivers is difficult for several reasons. These reasons include absorption of energy by soft formations, widely spaced receivers, mechanical noise as from tool movement and electrical noise produced from electronics within the tool. Energy absorption is a significant problem since it reduces the amplitude of the first few cycles in the acoustic wave arriving at each receiver. The conventional amplitude discriminator and method gives poor results under adverse signal conditions, i.e., low signal levels and high noise levels.

Therefore, it is a feature of the present invention to provide an improved method and apparatus for treating well logging signals so as to accurately determine the first arrival of the acoustic wave at a downhole receiver after the transmitter burst by measuring the energy content of the signal relative to threshold noise.

It is another feature of the present invention to provide an improved method and apparatus that provides a pulse signal of a given magnitude and duration indicative of the first arrival of the acoustic wave at a downhole receiver.

It is yet another feature of the present invention to provide an improved method and apparatus that accurately determines the first arrival of the acoustic wave at a downhole receiver by producing a pulse of given amplitude and duration irrespective of threshold noise or subsequent acoustic wave arrivals.

It is an additional feature of the present invention to provide an improved method and apparatus that accurately detects by a pulse the first arrival of the acoustic wave at a downhole receiver with greatly improved detection ability and repeatability while the electronic circuitry required for this result has been reduced in comparison to the conventional amplitude discriminator systems.

SUMMARY OF THE INVENTION

In accordance with this well-logging invention, there is provided in method and apparatus the processing of a received acoustic well logging signal.

In the preferred embodiment of the invention, in procedural steps and elements, the received signal is amplified sufficiently to clip same at the largest signal amplitude. The amplified signal is converted RMS to a DC level signal. The DC level signal is stored for a given period of time immediately before first arrival of the acoustic wave signal. The stored DC level signal is compared with the continuing DC level signal with the providing in a comparator of an output DC signal when the continuing DC level signal has a certain magnitude increase. Then, a pulse of given magnitude and duration is generated when the compared output DC signal has the certain increased magnitude.

BRIEF DESCRIPTION OF THE DRAWINGS

So that the manner in which the above-recited features and advantages of the invention, as well as others which will become apparent, are attained and can be understood in detail, more particular description of the invention briefly summarized above may be had by reference to the embodiments thereof which are illustrated in the drawings, which drawings form a part of this specification. It is to be noted, however, that the appended drawings illustrate only preferred embodiments of the invention and are therefore not to be considered limiting of its scope, for the invention may admit to other equally effective embodiments.

IN THE DRAWINGS

FIG. 1 is a schematic representation of a well-logging tool useful in making acoustic velocity measurements.

FIG. 2 is an amplitude versus time representation of typical well-logging signals detected by the receiver in the system shown in FIG. 1.

Figure 3:
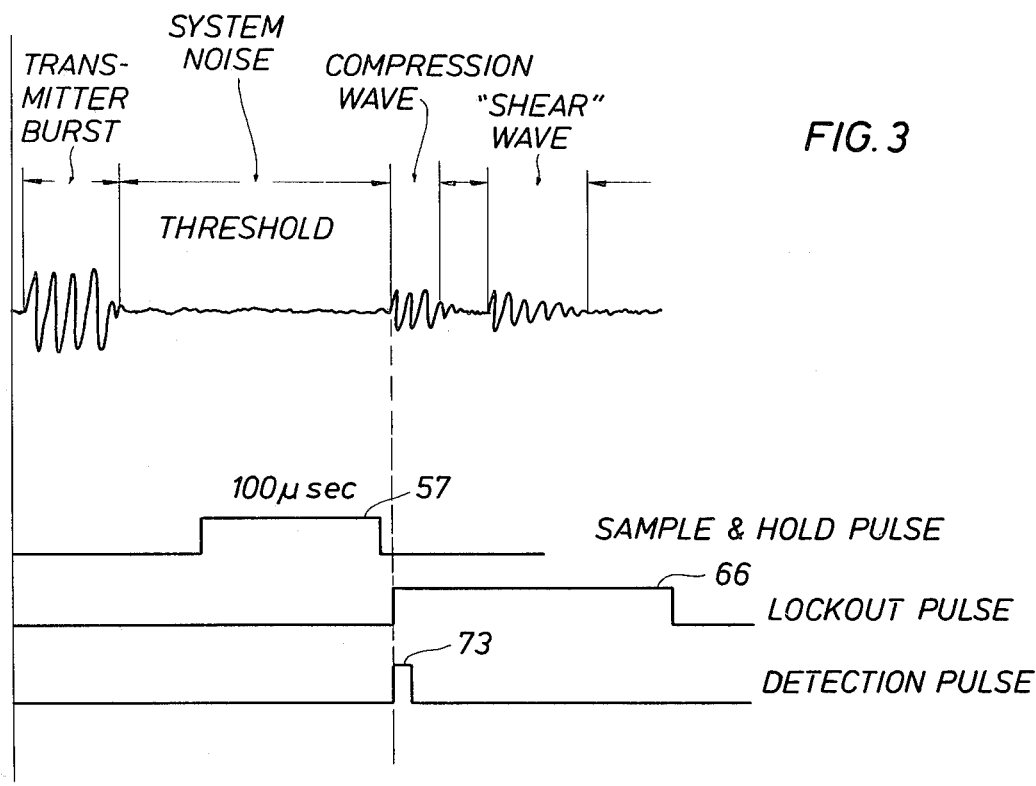

FIG. 3 is a graphic representation of the well-logging signal from receiver 24A as shown in FIG. 1 in comparison to the several timed functions performed in the present method and apparatus of well-logging.

Figure 4:
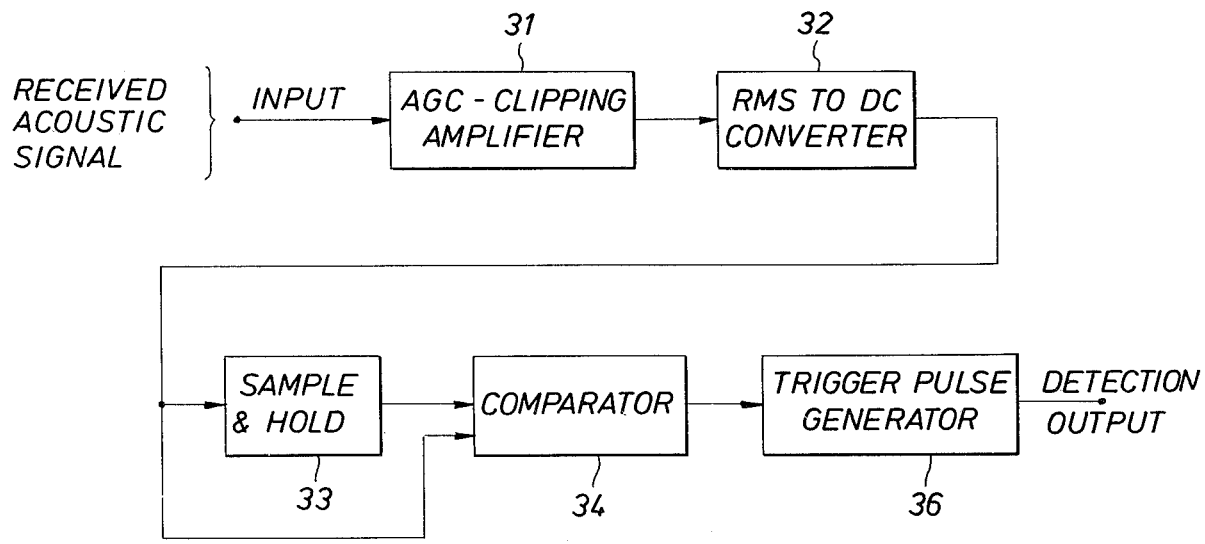

FIG. 4 is a simplified block diagram of the preferred embodiment of the invention as described hereinafter.

FIG. 5 is a schematic of electronics used in the preferred embodiment of the invention in method and apparatus for well-logging.

DESCRIPTION OF PREFERRED EMBODIMENTS

Acoustic wave energy has been extensively studied by experts for clues to its makeup and characteristics that may be of interest in revealing information valuable in a well-logging application. It is now generally believed that a typical acoustic wave is made up of a number of component parts including the compression wave (also known as the primary wave, the P-wave and the dilatational wave), the shear wave (also known as the secondary wave, the transverse wave and the rotational wave), the pseudo-Rayleigh wave (also known as the Rayleigh-coupled head wave), the Stonely wave, and the extensional or tube wave.

The theory of each of the waves is not important for an understanding of the present invention, but it is known that the formation shear wave and the pseudo-Rayleigh wave (which are surface waves associated with the borehold-formation interface), appear very close in time with one another, and may actually be indistinguishable from each other. However, these acoustic waves may arrive at a down-hole receiver in succession timewise after the first arrival of one acoustic wave. Also of note is that a compression wave travels at a rate of about 50–100 microseconds per foot in a typical formation and both a shear wave and/or a pseudo-Rayleigh wave travels at a rate of about 80–160 microseconds per foot. Hence, there is a time separation between a compression wave and a shear wave but not a very noticeable separation between a shear wave and a pseudo-Rayleigh wave. Hence as used hereinafter, the term "acoustic" wave includes both of these latter closely associated components that are actually believed to exist. The method and apparatus for well-logging disclosed herein is for the purpose of detecting the first arrival of the acoustic wave at a downhole receiver irrespective of the possible simultaneous arrivals of the compression and shear waves.

A compression wave in acoustic energy is a propagating wave traveling in some bulk media in which the particle motion is in the same direction as the direction as the direction of propagation of the energy in the acoustic wave. A "shear" wave is a propagating wave traveling in a bulk media in which the particle motion is in a direction at a right angle to the direction of propagation of the energy in the acoustic wave. Compression waves are sustainable both in liquid as well as solid media. "Shear" waves are sustainable in solid media but not in liquid media (at least they are greatly attenuated in liquid media).

A compression wave traveling in a solid (e.g., the formation) along a wall or interface adjacent a fluid excites or stimulates a compression wave in the fluid of relatively low amplitude because the formation particle motion is parallel to the liquid/solid (borehole fluid/formation) interface. A "shear" wave stimulated by the same transmitter or source traveling along the same path will sometimes be a larger and sometimes will be a smaller amplitude wave than the related compression wave, but will proportionally stimulate a larger compression wave in the fluid, because its particle motion is perpendicular to the liquid/solid interface. A receiver spaced apart from the transmitter will usually receive first the compression wave and then the "shear" wave. It is desirable to locate precisely in time the first arrival of the acoustic wave after the transmitter burst responsible for producing same.

Now referring to the drawings and first to FIG. 1, an acoustic logging system used to receive acoustic signals of compression wave and/or "shear" wave energy. In such a system, a logging tool 10 is suspended in a well bore 12 via a cable 14 that both bears the weight of the tool and includes electrical conductors to carry power and signals to and from surface electronics 16. The tool carries an acoustic transmitter 18 for imparting an acoustic wave impulse or burst via surrounding borehole fluid 20 into adjacent formation 22. In the illustration, the transmitter is shown near the bottom of the tool; however, in an actual installation, the transmitter may be located near the top of the tool. In any event, the transducer arrangement for the transmitter is aligned such that the acoustical energy emitted therefrom passes through the fluid in the borehole by compression wave action and enters the wall of the borehole. It is convenient to illustrate by arrows in accordance to ray theory (although this is an inexact theoretical explanation of what really occurs) that a complex acoustic wave travels up the interface of the borehole and excites wave motion in fluid 22 so that acoustic wave motion is received by a receiver 24 carried in the tool and spaced apart from transmitter 18 and at a receiver 24A carried in the tool above receiver 24. The transmitter also generates a sync pulse to surface electronics 16 when the transmitter 18 is "fired".

FIG. 2 illustrates in a combination analog logging signal a nominal output signal as detected by the receivers from the acoustic wave. The signal from receiver 24 is shown in the top waveform and the signal from receiver 24A is shown in the lower waveform. The transmitter burst is first received, after which the signal decays to only a nominal value, reflective of the inherent threshold noise of the system. The compression wave as the first arrival of the acoustic wave is the next part of the receiver output signal to arrive, followed by the "shear" wave with a second inherent threshold noise period. Casually observing and separating the compression wave and "shear" wave is usually not possible since the acoustic energy from multiple paths and reflections from the compression wave usually still exists when the onset of the "shear" wave occurs and thereafter the two waves result in an overlapping complex signal. Therefore, the present well-logging invention is adapted to detect the first arrival of the acoustic wave produced by the transmitter burst irrespective of the compression or shear wave components therein.

Generally speaking valuable information is contained in the velocity (travel time occurrence) of the first arrival of the acoustic wave signal, after the transmitter burst event. This information relates to the lithological character of the geological formation transversed by the well bore 12.

FIG. 4 illustrates in block diagram a system for practicing the present well-logging invention. The received acoustic wave signal, from the receiver 24A, is the input to the system. However, the output signal from the receiver 24 can be substituted as the input signal, if desired. The acoustic signal is applied to an automatic gain control amplifier 31 that is operated at a fixed gain condition throughout the logging procedure. More particularly, the amplifier 31 amplifies the input signal sufficiently to clip same (flat-top) at the largest signal amplitudes. In no event should the gain of the amplifier 31 be adjusted manually during the logging procedure.

The amplified signal from the output of the amplifier 31 is the input signal to a RMS-to-DC converter 32. The converter 32 produces a DC level signal which preferably has a sufficient period so as not to produce fast changes in potential magnitude. For example, the period can be from 50 to 75 microseconds. Therefore, the DC level signal is representative of the amplified signal but with a longer period function.

The DC level signal from the converter 32 is used in two processing functions. First, the DC level signal for a given time period (e.g. 100 microseconds) immediately before the first arrival of the acoustic wave at the receiver 24A is stored in a sample and hold device 33. The stored DC level signal thereby represents the noise energy in the received acoustic signal in the latter portion of the threshold, i.e., the system noise. The stored output DC level signal of the device 33 is one input to a comparator 34.

While the stored DC level signal is applied to the comparator 34, the continuing DC level signal from the output of the sample and hold 33 is applied as the second input to the comparator 34. In the comparator 34, the noise level representative stored DC level signal is compared to the continuing DC level signal until the latter signal rises to a value somewhat greater than the threshold noise level stored DC level signal. For example, the difference in these input signals to the comparator 34 when reaching a certain increased magnitude (e.g. 1.5) produces a comparator output DC signal indicating first arrival of the acoustic signal at the receiver 24A.

For best results, the comparator output DC signal is the input to a trigger pulse generator 36 which produces at its output a single pulse of given magnitude and duration. This single pulse can be used as the timing event marking the first arrival of the acoustic wave signal at the receiver 24A after the transmitter burst.

Preferably, the system of FIG. 4 includes additional features to insure that the successive arrivals of subsequent acoustic waves at the receiver 24A do not produce a false timing event marker pulse. This improved system is shown in schematic in FIG. 5.

In the circuitry of FIG. 5, there are several elecronic components solid state devices or integrated modules. Although it is apparent that these elements employ power sources with positive, negative, ground and circuit common connections, these connections are omitted to simplify the present description. The output from the receiver 24A (or logarithmic counterpart from converter 41) is applied through a switch 37 to the input of the AGC amplifier 31. The use of the capacitor 38 and resistors 39 and 42 is to provide the amplifier with fast attack—slow decay automatic gain control function.

The amplified signal from the amplifier 31 is passed through a voltage amplifier 43 which has a gain of about 8 in amplifying the incoming signals. In addition, the amplifier 43 will flattop or clip the largest signal amplitudes so as to enhance detection of the intermediate amplitude signals relative to the threshold noise levels. The amplified output signal from the voltage amplifier 43 is applied through a DC blocking capacitor 44 to the RMS-to-DC converter 32. The several capacitors 46, 47 and 48 associated with the converter 32 provide the conversion function at its output of a DC level signal proportional to the RMS value of the input signal, and preferably averaged over a 50 to 75 microsecond period.

The DC level signal is preferably passed through a voltage amplifier 49 to increase signal magnitude by a factor of 3 for easier comparison and for greater isolation from subsequent circuitry.

The amplified DC level signal is applied as the input to the sample and holding device 33 and as one input to a comparator 34.

The device 33 is associated with a signal storage capacitor 51 and resistors 52 and 53. The device 33 is arranged to store the DC level signal for a sufficient time period so that a representative signal is available over a significant part of the threshold noise system of the logging signal. Naturally, the device 33 does not store continuously the DC level signal. For selective storage functioning, the gate 54 of the device 33 receives an "on" signal from a one-shot generator 56 which operates in synchronism with the burst from the transmitter 18. The "on" signal from generator 56 lets the device 33 store the DC level signal for a short period immediately before the first arrival of the acoustic wave at the receiver 24A. For example, the device 33 is "on" for about 100 microseconds before arrival of the compression wave illustrated in FIG. 3. The "on" signal 57 from the generator 56 can be represented by a square wave function relative to the sample and holding period. It is important that the sample and holding period occur in the latter part of the threshold noise portion of the acoustic signal but this period should not include any portion of the first arrival acoustic signal from either the compression or shear waves, or any combination thereof. The generator 56 is of the character of a monostable multivibrator with a Schmitt trigger gate so as to have a stable "off" state and a fixed "on" period as the transitory state. These functions are determined by the capacitor 55 and resistor 60. Therefore, once the generator 56 receives the transmitter burst event signal, it will produce after a certain delay the "on" signal 57 for a selected period of time.

The output of the comparator 34, as determined by the capacitor 58, resistors 59 and 61, and diode 62 is produced when the DC level signal at its inputs has a certain increased magnitude, e.g., 1.5. Then the comparator 34 produces an output DC signal representing the event of the first arrival of the acoustic signal at the end of the threshold noise period.

The comparator output DC signal is amplified in the voltage amplifier 63 where the resulting fast rising DC signal is the input to a one shot lockout pulse generator 64. The generator 64 produces a lockout pulse signal 66 (FIG. 3) with a time constant function determined by capacitor 67 and resistor 68. More particularly, the time constant in the generator 64 should be of substantial duration (e.g. 20 milliseconds) so as to insure that the lockout pulse signal 66 extends through a substantial portion of the acoustic signal following the first arrival acoustic wave. As a result, once the generator 64 is triggered to produce the lockout pulse signal 66, it cannot be falsely actuated by subsequent arriving acoustic waves. This function can be readily appreciated by viewing FIG. 3.

The lockout pulse signal is applied to the generator 69. The capacitor 71 and resistor 72 produce a time constant function in the generator 69 so that the output pulse 73 (FIG. 3) is of a given magnitude and duration. As a result, the generator 69 produces as a true square wave function the pulse signal 73 independent of any loading or acoustic signal variations. This positive voltage pulse 73 can be of any selected magnitude and duration that is desired for subsequent signal processing. For example, the pulse 73 may have a duration of 4 microseconds. The magnitude of the pulse 73, if less than desired or for other reasons, can be adjusted in a voltage amplifier 74.

The pulse 73 is passed into the input of the voltage amplifier 74 which by fixed gain adjustment gives the pulse 73 a signal magnitude of selected value. For example, the pulse 73 is desired to be of a quality for transmission in a telemetering transmission system to a remote surface disposed data processing center 76. For this use, the amplifier 74 adjusts the pulse 73 to have an output level of positive 5 volts at the data processor terminal 77. As a result, irrespective of the magnitudes of noise level in the threshold, or the difference in acoustic signal increase marking the first arrival of the acoustic wave at the receiver 24A, the timing marker event of the pulse 73 is specific and with proper magnitude and duration for ready signal processing, especially in digital equipment connected to output terminal 77.

In the above discussion, a safe inherent threshold noise time duration can be accurately determined since it is known that acoustic compression waves traveling in geological formations only rarely travel any faster than about 50 microseconds per foot. Therefore, the spacing between the transmitter and receivers 24 and 24A allow a reliable estimate to be made of the threshold noise period.

While particular embodiments of the invention have been shown and described, it will be understood that the invention is not limited thereto, since modifications may be made and will become apparent to those skilled in the art. It should be noted that the above discussion has been made with respect to acoustic well logging and more particularly with respect to detecting the first arrival of the acoustic wave signal in a downhole receiver irrespective of the threshold noise level or the possible simultaneous arrival of the low level compression and shear waves. The event of first arrival of the acoustic wave is marked by a single positive voltage pulse of predetermined magnitude and duration. As a result, data processing is more accurate and less difficult to produce.

What is claimed is:

1. The method of processing a received acoustic well logging signal in a logging system having an acoustic transmitter and at least one acoustic receiver including the steps;
   (a) amplifying the received signal by a constant amount, said constant amount selected sufficient to clip same at the largest expected signal amplitudes,
   (b) converting the RMS value of the amplified signal to a DC level signal representative of the average noise level in the received signal;
   (c) storing said average noise level signal for a given time period immediately after transmitter firing and before first expected arrival of the acoustic wave signal;
   (d) comparing said stored DC average noise level signal with a DC level signal representative of the instant undelayed amplified received signal to provide a comparator output DC signal when said instant undelayed DC level signal has a predetermined increase in magnitude; and
   (e) generating an output pulse of given amplitude and time duration when said comparator output DC signal has the predetermined increase in magnitude.

2. The method of claim 1 wherein in step (c) the given time period is about 100 micro seconds before expected arrival of the first acoustic wave.

3. The method of claim 1 wherein in step (b) the RMS value of the amplified signal is converted to a DC level signal having a time constant of about 50 to 75 microseconds.

4. The method of claim 1 wherein in step (d), the predetermined increase in magnitude in the comparator output signal to generate said pulse occurs when the DC level of the instant undelayed amplified signal at first arrival of the acoustic wave is about 1.5 times greater than said stored DC average noise level signal before first arrival of the acoustic wave.

5. The method of claim 1 wherein in step (c) the given time period is about 100 microseconds before the expected arrival of the first acoustic wave and the RMS value of the amplified signal is converted to a DC level signal with a time period of about 50 to 75 microseconds.

6. The method of processing a received acoustic well logging signal in a logging system having an acoustic transmitter and at least one acoustic receiver, including the steps:
   (a) amplifying the received acoustic signal at a fixed gain throughout the logging procedure with said fixed gain being sufficient to clip said received acoustic signal at the largest signal amplitude;
   (b) converting the RMS value of the amplified received acoustic signal to a DC level signal representative of the system noise level with a time period less than the threshold period between a transmitter firing pulse and the expected first arrival of the acoustic wave;
   (c) storing said DC noise signal during said threshold period as representative of the noise level in the received signal immediately before expected first arrival of the acoustic wave;
   (d) comparing said stored threshold DC noise level signal with an instant undelayed DC level signal representative of the amplified received acoustic signal to provide a comparator output DC signal when said instant undelayed DC level signal has a predetermined amount of increased magnitude relative to said stored threshold DC noise level signal; and
   (e) generating a pulse of given magnitude and duration when the comparator output DC signal has at least said predetermined amount of increased magnitude.

7. The method of claim 6 wherein in step (b), said threshold period is less than 100 microseconds.

8. The method of claim 6 wherein in step (c), said DC noise level signal in said threshold period is stored for about 100 microseconds immediately before the expected first arrival of the acoustic wave from said transmitter.

9. The method of claim 6 wherein in step (e), said pulse of given magnitude is generated when the comparator output DC signal at first arrival of the acoustic wave is about 1.5 times greater than said stored threshold DC noise level signal.

10. Apparatus for processing a received acoustic well logging signal in a logging system having an acoustic transmitter and at least one acoustic receiver comprising;
   (a) amplifier means having a fixed value of gain sufficient to clip the largest signal amplitudes of the received acoustic signal from said receiver throughout a logging operation;
   (b) converter means receiving the amplified received signal and providing a DC level signal corresponding to the RMS value thereof for a period less than the threshold period between a transmitter firing pulse and the first expected arrival of the acoustic wave resulting therefrom;
   (c) storing means for sampling and holding said DC level signal in said threshold period, and providing in its output a threshold noise DC level output signal;
   (d) comparator means with inputs receiving the DC level signal and the threshold noise DC level output signal, and producing at its output an output signal when the inputs reflect a certain increased magnitude between the DC level signal and the threshold DC noise level output signal from the storing means, and
   (e) one-shot generator means connected to the output of said comparator means and providing in its output a pulse of given magnitude and duration when the output DC signal of said comparator means reaches said certain increased magnitude.

* * * * *